(12) United States Patent
Nakagawa

(10) Patent No.: US 6,791,783 B2
(45) Date of Patent: Sep. 14, 2004

(54) MAGNETIC HEAD DEVICE WITH MICROACTUATOR FINE MOTION DEVICE HAVING ELECTRODE SECTION MOLDED OUT OF RESIN

(75) Inventor: Masayoshi Nakagawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 356 days.

(21) Appl. No.: 10/099,351

(22) Filed: Mar. 15, 2002

(65) Prior Publication Data

US 2002/0171968 A1 Nov. 21, 2002

(30) Foreign Application Priority Data

Mar. 19, 2001 (JP) ........................................ 2001-079580

(51) Int. Cl.[7] .............................. G11B 5/596; G11B 5/56
(52) U.S. Cl. ..................................... 360/75; 360/294.4
(58) Field of Search ............................... 360/75, 78.05, 360/77.02, 290, 294, 294.1, 294.2, 294.3, 294.4, 260, 264, 264.2, 264.3, 264.4, 264.5, 244.2; 29/603.03

(56) References Cited

U.S. PATENT DOCUMENTS

| | | | |
|---|---|---|---|
| 5,657,188 A | 8/1997 | Jurgenson et al. | ........ 360/294.4 |
| 6,046,888 A | 4/2000 | Krinke et al. | ............ 360/294.3 |
| 6,604,431 B1 * | 8/2003 | Soga et al. | ................... 73/777 |
| 2003/0074783 A1 * | 4/2003 | Boismier et al. | ........ 29/603.03 |

* cited by examiner

Primary Examiner—Andrew L. Sniezek
(74) Attorney, Agent, or Firm—Brinks Hofer Gilson & Lione

(57) ABSTRACT

A magnetic head device including a slider, a resilient supporting member which supports the slider, and piezoelectric elements which are mounted on the resilient supporting member. The piezoelectric elements each include a piezoelectric layer and a pair of electrode layers, a first electrode layer and a second electrode layer. The surface of each second electrode layer and a stationary base end portion and a sliding portion are joined together through an electrically conductive adhesive resin, and both end portions of each piezoelectric element and the stationary base end portion and the sliding portion are joined together through a non-conductive adhesive resin.

31 Claims, 7 Drawing Sheets

MAGNETIC HEAD DEVICE WITH MICROACTUATOR FINE MOTION DEVICE HAVING ELECTRODE SECTION MOLDED OUT OF RESIN

BACKGROUND OF THE INVENTION

1. Field of the Invention

The present invention relates to a magnetic head device.

2. Description of the Related Art

FIG. 6 is a plan view of a conventional hard disk device. The hard disk device comprises a magnetic disk 101, a spindle motor 102 which rotationally drives the magnetic disk 101, a carriage 103, a load beam 104, a slider 105, and a voice coil motor 106. A magnetic head device is roughly formed by the load beam 104 and the slider 105.

A base end portion 104b of the load beam 104, which is a resilient supporting member, is connected to an end portion 103a of the carriage 103, which is a rigid member. The slider 105 is mounted to an end 104a of the load beam 104 through a flexure (not shown).

The carriage 103 and the load beam 104 are driven in a radial direction of the magnetic disk 101 by the voice coil motor 106 in order to carry out a seek operation and a tracking operation. The seek operation is carried out to move a reproducing element and a recording element, which are mounted to the slider 105, above any recording track. The tracking operation is carried out to achieve fine adjustment so as to maintain the positions of the reproducing element and the recording element above a centerline of a recording track.

In order to increase recording density, it is necessary to increase the precision of the tracking operation by increasing the driving frequency of the voice coil motor 106. Since the driving frequency of the voice coil motor 106 is related to the resonant frequency of the load beam 104, there is a limit as to how high the driving frequency of the voice coil motor 106 can be made. Thus, there is a limit as to how high the precision of the tracking operation can be made.

To overcome this problem, a magnetic head device which has a microactuator mounted to the load beam 104 has been developed. The magnetic head device can carry out a tracking operation as a result of moving only an end portion of the load beam 104 by the microactuator.

FIG. 7 is a perspective view of the load beam 104. FIG. 8 is a sectional view of the main portion of FIG. 7.

The load beam 104 is formed of a stainless-steel plate spring material, and includes a stationary base end portion 111a and a swinging portion 111b. The stationary base end portion 111a is held by the carriage, and the swinging portion 111b can swing horizontally with respect to the stationary base end portion 111a. Arms 111c and 111c, which extend in the longitudinal direction of the stationary base end portion 111a, are formed on both sides of the front end portion of the stationary base end portion 111a. The swinging portion 111b is connected to the arms 111c and 111c through resilient supporting portions 111d and 111d.

Piezoelectric elements 112 and 113, which are microactuators, are placed on the swinging portion 111b and the stationary base end portion 111a by placing them over a gap 111e.

The piezoelectric element 112 comprises a piezoelectric layer 112a and electrode layers 112b and 112c. The piezoelectric element 113 comprises a piezoelectric layer 113a and electrode layers 113b and 113c. The piezoelectric layers 112a and 113a are formed of, for example, lead zirconate titanate (PZT). The electrode layers 112b and 112c and 113b and 113c are formed of, for example, metallic films deposited onto the top and bottom sides of their corresponding piezoelectric layers 112a and 113a.

As shown in FIG. 8, the electrode layers 112c and 113c of the corresponding piezoelectric elements 112 and 113 and the swinging portion 111b and the stationary base end portion 111a are joined together by an electrically conductive adhesive resin 115.

In FIG. 7, reference numeral 121 denotes a slider which is mounted to an end of the swinging portion 111b through a flexure (not shown).

As shown in FIG. 8, the load beam 104 is connected to ground. As shown in FIG. 7, the electrode layer 112b of the piezoelectric element 112 and the electrode layer 113b of the piezoelectric element 112 are connected by a gold wire 114a. As shown in FIGS. 7 and 8, a different gold wire 114b is connected to the electrode layer 113b of the piezoelectric element 113, and to a control circuit 114c. By virtue of this structure, a control voltage can be applied to the piezoelectric elements 112 and 113 from the control circuit 114c.

The piezoelectric elements 112 and 113 are elements which get distorted when a voltage is applied through the electrode layers 112b and 112c, and 113b and 113c, respectively.

The piezoelectric layers 112a and 113a of the corresponding piezoelectric elements 112 and 113 polarize in the film thickness directions. However, the polarization directions are opposite each other. Therefore, when the same control voltage is applied to the electrode layers 112c and 113c, one of the piezoelectric elements expands in the longitudinal direction thereof, while the other piezoelectric element contracts in the longitudinal direction thereof.

As a result, the resilient supporting portions 111d and 111d get distorted, so that the position of the slider 121, mounted to an end of the swinging portion 111b, changes. In other words, a precise tracking operation can be carried out by slightly moving the slider 121, mounted to an end of the swinging portion 111b, in the widthwise direction of a track.

As the recording density of the magnetic disk 101 increases, it becomes necessary to increase the precision of the tracking operation. By the load beam 104, it is possible to carry out a precise tracking operation, so that the recording density can be increased.

The electrically conductive adhesive resin 115 is required to maintain electrical conduction between the load beam 104 and the piezoelectric elements 112 and 113, and to function so that the deformation of the piezoelectric elements 112 and 113 reliably causes deformation of the load beam 104 by increasing the bonding strength between the load beam 104 and the piezoelectric elements 112 and 113.

However, the commonly used electrically conductive adhesive resin 115 is an epoxy adhesive resin mixed with, for example, a metal filler. Since the bonding strength is reduced by mixing the metal filler, the deformation of the piezoelectric elements 112 and 113 cannot reliably cause deformation of the load beam 104, thereby giving rise to the problem that a precise tracking operation cannot be carried out.

The electrically conductive adhesive resin 115 tends to deteriorate at a high temperature. Therefore, when, for example, the magnetic head device is continuously operated for a long period of time, the temperature of the whole magnetic head device rises, so that the bonding strength of the electrically conductive adhesive resin 115 is reduced, thereby also resulting in the problem that a precise tracking operation cannot be carried out.

SUMMARY OF THE INVENTION

In view of the above-described situation, it is an object of the present invention to provide a magnetic head device which can precisely carried out a tracking operation as a result of increasing bonding strength between a piezoelectric element and a load beam.

To this end, the present invention uses the following structures.

According to the present invention, there is provided a magnetic head device comprising a slider having provided thereat a reproducing element and a recording element, with the reproducing element being used to detect a magnetic signal recorded on a recording medium and a recording element being used to record a magnetic signal on the recording medium; a resilient supporting member which supports the slider; and a piezoelectric element, mounted on the resilient supporting member, for changing the position of the slider by distorting the resilient supporting member. In the magnetic head device, the piezoelectric element comprises a piezoelectric layer and a pair of electrode layers which sandwich the piezoelectric layer. The resilient supporting member comprises a stationary base end portion and a swinging portion, the swinging portion supporting the slider as a result of being connected to the stationary base end portion, and the swinging portion being swingable with respect to the stationary base end portion by the piezoelectric element. With one of the electrode layers of the piezoelectric element opposing the stationary base end portion and the swinging portion, the piezoelectric element is disposed so as to be placed on both the stationary base end portion and the swinging portion. A surface of the one of the electrode layers, the stationary base end portion, and the swinging portion are joined together through an electrically conductive adhesive resin, and both end portions of the piezoelectric element in directions in which the piezoelectric element expands and contracts, the stationary base end portion, and the swinging portion are joined together through a nonconductive adhesive resin.

According to the magnetic head device, the piezoelectric element is joined to the stationary base end portion and the swinging portion by an electrically conductive adhesive resin and a non-conductive adhesive resin. Therefore, compared to the case where only an electrically conductive adhesive resin is used, the bonding strength can be increased, so that the resilient supporting member is reliably deformed in correspondence with the deformation amount of the piezoelectric element. Therefore, it is possible to increase the precision of a tracking operation.

In addition, since a non-conductive adhesive resin is applied to both end portions of the piezoelectric element in the directions in which the piezoelectric element expands and contracts, the non-conductive adhesive resin does not interfere with the expansion and contraction of the piezoelectric element. Therefore, it is possible to increase the precision of the tracking operation.

Further, when the non-conductive adhesive resin is applied to both end portions of the piezoelectric element, even if the non-conductive adhesive resin is applied to both electrode layers which sandwich the piezoelectric layer, a short circuit does not occur between the electrode layers because the non-conductive adhesive resin is not electrically conductive.

In the magnetic head device, a lead used for applying a voltage may be connected to the other electrode layer of the piezoelectric element, and the nonconductive adhesive resin may be applied from both end portions of the piezoelectric element to part of the other electrode layer and to a connection portion of the lead and the other electrode layer.

According to the magnetic head device, by applying the non-conductive adhesive resin to both end surfaces of the piezoelectric element and part of the other electrode layer, and to the connection portion of the lead and the other electrode layer, the lead connection portion can be protected by the non-conductive adhesive resin, thereby making it possible to reinforce the bonding strength between the lead connection portion and the other electrode layer. Therefore, it is possible to prevent breakage of the lead from the second electrode layer.

The non-conductive adhesive resin is applied to both electrode layers which sandwich the piezoelectric layer. Since the non-conductive adhesive resin is not electrically conductive, a short circuit between the electrode layers does not occur.

DESCRIPTION OF THE PREFERRED EMBODIMENT

Hereunder, a description of an embodiment of the present invention will be given with reference to the drawings.

Figure 1:
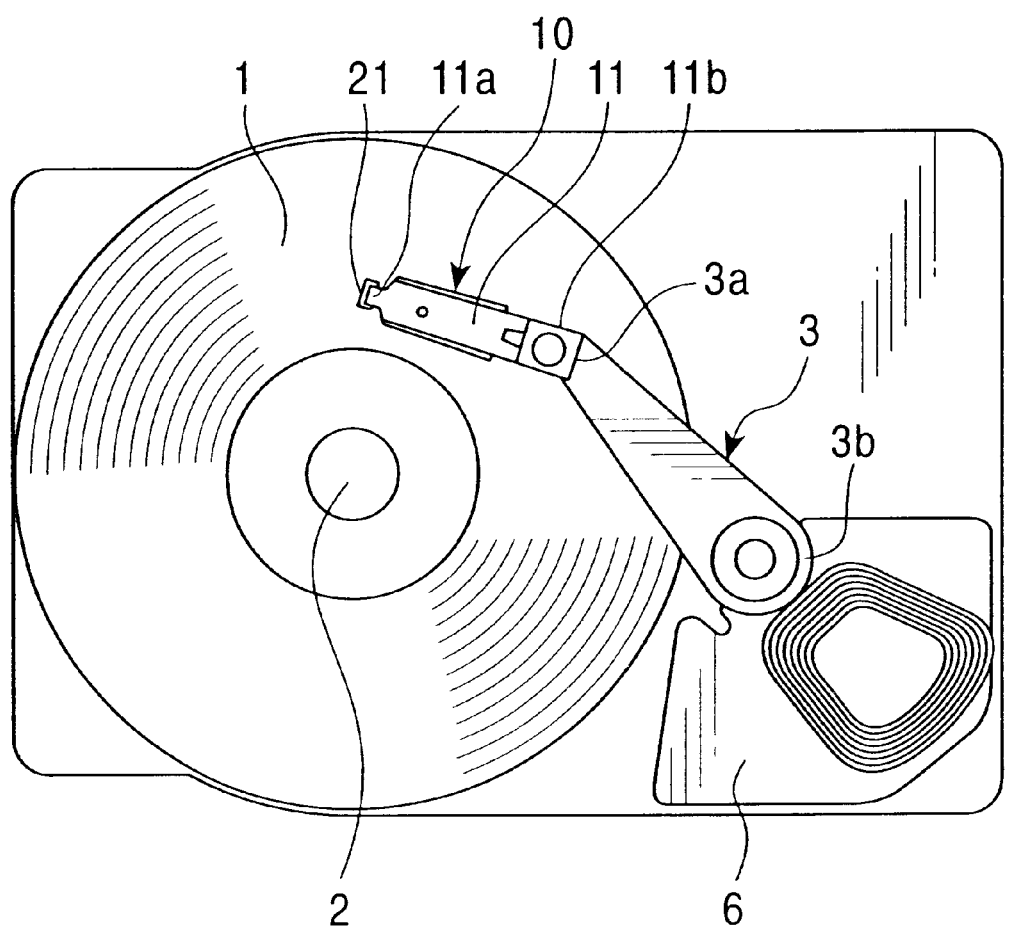
FIG. 1 is a plan view of a hard disk device including a magnetic head device of an embodiment of the present invention.
Figure 2:
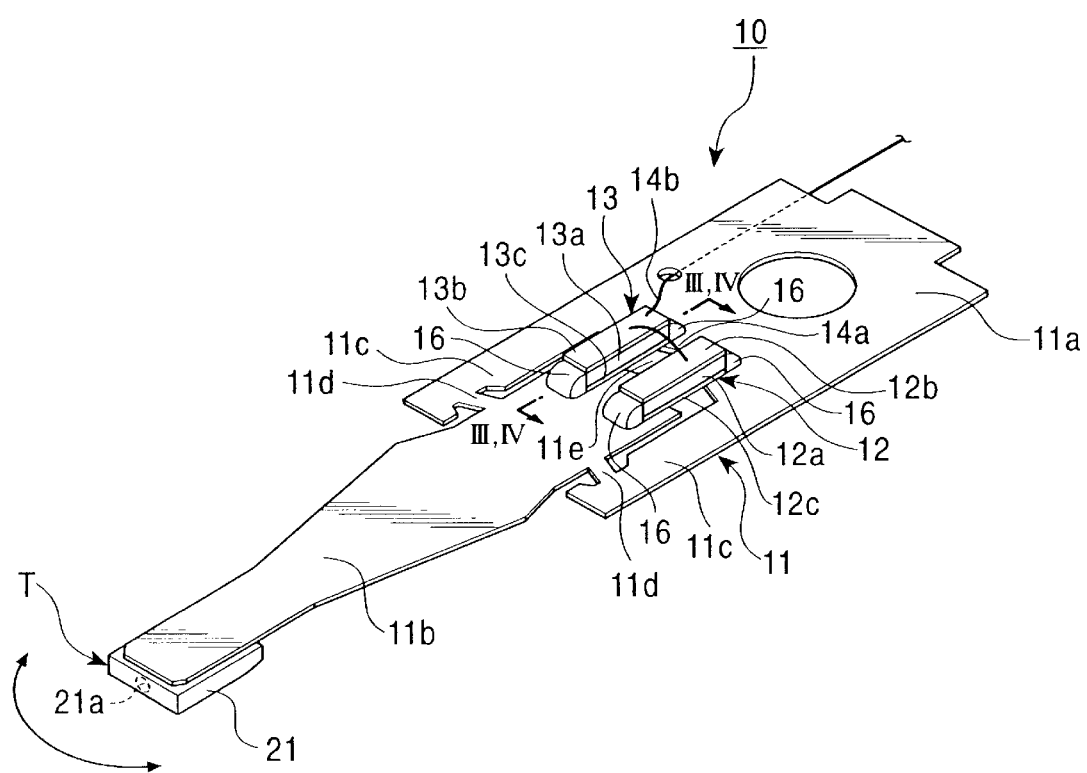
FIG. 2 is a perspective view of the magnetic head device of the embodiment of the present invention.
Figure 3:
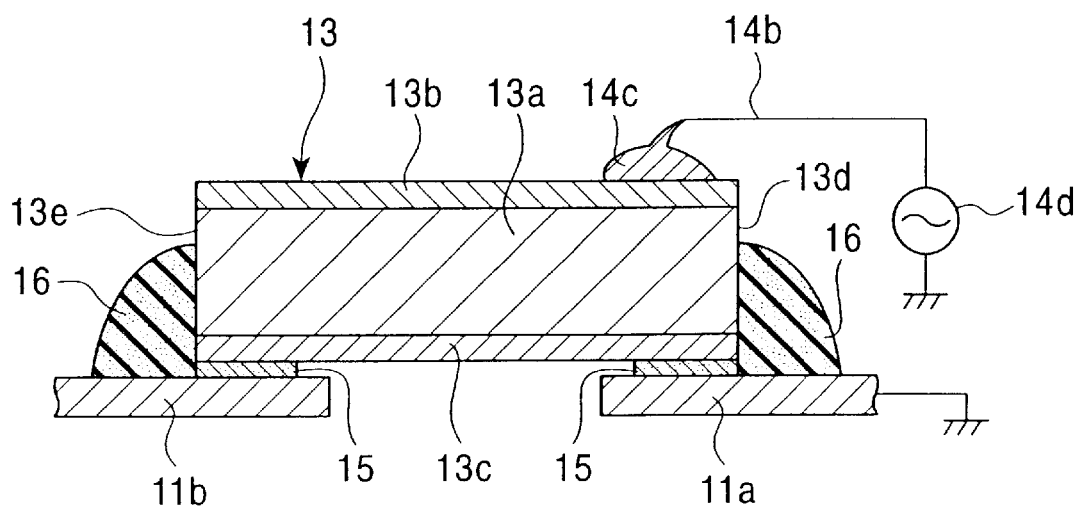
FIG. 3 is an enlarged sectional view taken along line III–IV of FIG. 2.
Figure 4:
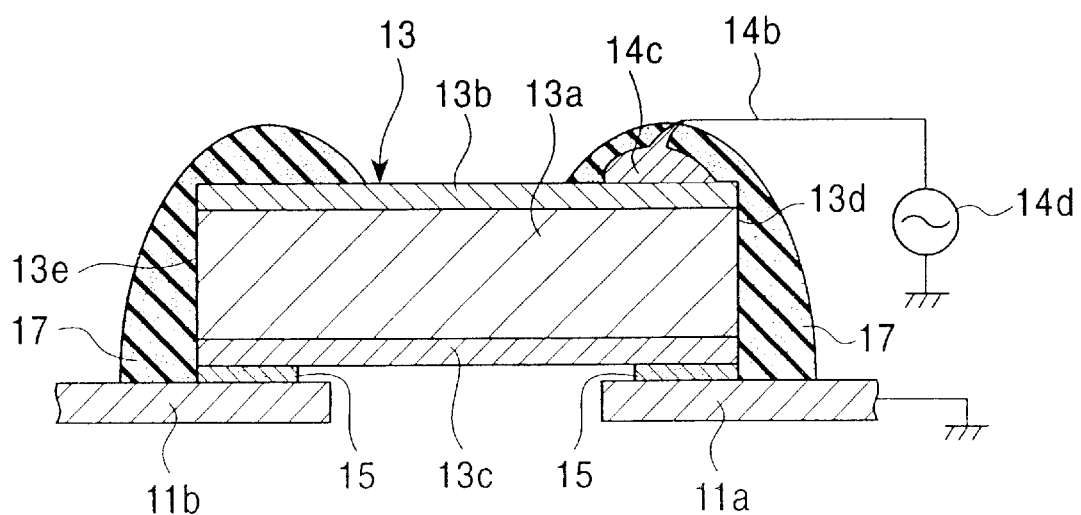
FIG. 4 is an enlarged sectional view taken along line III–IV of FIG. 2.

FIG. 1 is a plan view of a hard disk device including a magnetic head device of an embodiment of the present invention. FIG. 2 is a perspective view of the embodiment of the magnetic head device of the present invention. FIGS. 3 and 4 are enlarged sectional views taken along line III–IV of FIG. 2. For simplicity, FIGS. 1 to 4 are schematic views, so that the dimensional relationships between the component parts are not limited to those shown in FIGS. 1 to 4.

The hard disk device shown in FIG. 1 comprises a magnetic disk 1; a spindle motor 2 which rotationally drives the magnetic disk 1; a carriage 3; a load beam 11, which is a resilient supporting member; a slider 21; and a voice coil motor 6.

The load beam 11 is connected to and is supported by an end portion 3a of the carriage 3, which is a rigid supporting member. The voice coil motor 6 is mounted to a base end portion 3b of the carriage 3.

A magnetic head device 10 of the present invention is roughly formed by the load beam 11 and the slider 21.

The slider 21 is formed of a ceramic material and is mounted to an end of the load beam 11. As shown in FIG. 2, a thin-film element 21a is provided at a trailing-side end surface T of the slider 21. An ABS surface (air bearing surface or flying surface) is formed at the surface side of the slider 21 opposing a recording medium.

The thin-film element 21a shown in FIG. 2 is what is called a combination-type thin-film element including both a reproducing element (magnetoresistive (MR) head), used to reproduce a magnetic recording signal recorded on a recording medium, and a recording element (inductive head), used to record a magnetic signal on a recording medium. The reproducing element comprises a magnetoresistive element and a shield layer formed of a magnetic material. The magnetoresistive element makes use of a magnetoresistance effect, with a spindle valve film being a typical example of that which makes use of the magnetoresistance effect. The recording element is constructed by forming a coil and a core, formed of a magnetic material, into a pattern.

As shown in FIG. 2, piezoelectric elements 12 and 13 are mounted on the load beam 11, which is a resilient supporting member supporting the slider 21.

The load beam 11 is formed of a stainless-steel plate spring material. It comprises a stationary base end portion 11a, which is held by the carriage 3, and a swinging portion 11b, which can swing horizontally with respect to the stationary base end portion 11a. A gap 11e is provided between the stationary base end portion 11a and the swinging portion 11b. Arms 11c and 11c, which extend in the longitudinal direction of the stationary base end portion 11a, are formed on both sides of the front end portion of the stationary base end portion 11a. The swinging portion 11b is connected to the arms 11c and 11c through resilient supporting portions 11d and 11d.

Piezoelectric elements 12 and 13 are placed on the swinging portion 11b and the stationary base end portion 11a by placing them over a gap 11e.

As shown in FIGS. 2 and 3, the piezoelectric element 12 comprises a piezoelectric layer 12a and a pair of electrode layers 12b and 12c, which sandwich the piezoelectric layer 12a. The piezoelectric element 13 comprises a piezoelectric layer 13a and a pair of electrode layers 13b and 13c, which sandwich the piezoelectric layer 13a. The piezoelectric layers 12a and 13a are formed almost exclusively of piezoelectric materials such as lead zirconate titanate.

Using FIGS. 2 and 3, the joining structures of the piezoelectric elements 12 and 13 and the load beam 11 will be described in detail. The piezoelectric element 13 is an element which gets distorted when a voltage is applied to the electrode layers 13b and 13c, and which has the property of expanding and contracting in the longitudinal direction thereof. As shown in FIG. 2, with the electrode layer 13c facing the stationary base end portion 11a and the swinging portion 11b, the piezoelectric element 13 is placed on both the stationary base end portion 11a and the swinging portion 11b. An electrically conductive adhesive resin 15 is applied to the portion between the surface of the electrode layer 13c of the piezoelectric element 13 and the stationary base end portion 11a and to the portion between the surface of the electrode layer 13c and the swinging portion 11b. Through the electrically conductive adhesive resin 15, the piezoelectric element 13 is joined to the stationary base end portion 11a and the swinging portion 11b.

As shown in FIGS. 2 and 3, a non-conductive adhesive resin 16 is disposed on the outer sides of end surfaces 13d and 13e (both end portions) of the piezoelectric element 13, which are disposed at both sides of the piezoelectric element 13 in the directions in which the piezoelectric element 13 expands and contracts (that is, at both sides of the piezoelectric element 13 in FIG. 3 in the longitudinal direction thereof). The nonconductive adhesive resin 16 is applied to the end surfaces 13d and 13e. In this way, the end surfaces 13d and 13e of the piezoelectric element 13, the stationary base end portion 11a, and the swinging portion 11b are joined together through the nonconductive adhesive resin 16.

The joining structure in which the nonconductive adhesive resin 16 is applied to the piezoelectric element 13, which is shown in FIG. 3, is a structure in which the nonconductive adhesive resin 16 is only applied to the end surfaces 13d and 13e of the piezoelectric element 13. Therefore, the joining structure is not a structure in which the nonconductive adhesive resin is in contact with surface of the surface of the electrode layer 13b.

Even if the nonconductive adhesive resin 16 is applied to both of the electrode layers 13b and 13c of the piezoelectric element 13, a short circuit between the electrode layers 13b and 13c will not occur because the nonconductive adhesive resin 16 is not electrically conductive.

It is preferable that the nonconductive adhesive resin 16 be disposed at both sides of the piezoelectric element 13 in the directions in which the piezoelectric element 13 expands and contracts. The nonconductive adhesive resin 16 may protrude slightly from both end portions 13d and 13e of the piezoelectric element 13 in the widthwise direction of the piezoelectric element 13. Although the nonconductive adhesive resin 16 may be disposed outwardly from portions other than both end portions 13d and 13e of the piezoelectric element 13 in the widthwise direction of the piezoelectric element 13, the nonconductive adhesive resin 16 may interfere with the expansion and contraction of the piezoelectric element 13.

In addition, it is preferable that the nonconductive adhesive resin 16 be applied to both end surfaces 13d and 13e. When the nonconductive adhesive resin 16 is only applied to either one of the end surfaces, the bonding strength between the piezoelectric element 13 and the load beam 11 may not be sufficient.

The electrically conductive adhesive resin 15 may be, for example, an adhesive resin mixed with a metal filler or carbon particles. Examples of the adhesive resin are thermosetting epoxy resin, polyester adhesive resin, acrylic adhesive resin, polyolefin adhesive resin, and polyurethane adhesive resin. In particular, epoxy resin is preferably used.

The nonconductive adhesive resin 16 is preferably a thermosetting adhesive resin, such as a UV curable adhesive resin. Among the different types of UV curable adhesive resins, polyester UV curable adhesive resin or acrylic UV curable adhesive resin is preferably used.

As described above, the piezoelectric element 13 is joined to the load beam 11 using two types of adhesive resin, the adhesive resins 15 and 16.

FIG. 3 shows only the piezoelectric element 13. The joining structure of the piezoelectric element 12 is the same as the joining structure shown in FIG. 3.

The electrically conductive adhesive resin 15 affixes the piezoelectric element 13 to the stationary base end portion 11a and the swinging portion 11b, and maintains electrical conduction therebetween.

The nonconductive adhesive resin 16 affixes the piezoelectric element 13 to the stationary base end portion 11a and the swinging portion 11b, and reinforces the joining of the piezoelectric element 13 to the stationary base end portion 11a and the swinging portion 11b by the electrically conductive adhesive resin 15.

Using FIGS. 2 and 3, an electrical connection structure of the piezoelectric elements 12 and 13 and the load beam 11 will be described.

As described above, the piezoelectric elements 12 and 13 are joined to the load beam 11 while they are in electrical conduction with the load beam 11. The load beam 11 is connected to ground. The electrode layers 12b and 13b of the corresponding piezoelectric elements 12 and 13 are connected together by a gold wire 14a. A different gold wire 14b is connected to the piezoelectric element 13 and to a control circuit 14d.

As shown in FIG. 3, the gold wire 14b is connected to the surface of the electrode layer 13b of the piezoelectric element 13 through a connection portion 14c.

By virtue of the above-described structure, a control voltage can be applied to the piezoelectric elements 12 and 13 from the control circuit 14d.

The piezoelectric elements 12 and 13 are elements which expand and contract in the longitudinal direction thereof as a result of getting distorted when a control voltage is applied to the electrode layers 12b and 12c and the electrode layers 13b and 13c, respectively. By applying a voltage, the piezoelectric layers 12a and 13a of the corresponding piezoelectric elements 12 and 13 polarize in the film thickness directions thereof. However, the polarization directions are opposite to each other. Therefore, when the same electrical potential is applied to the electrode layers 12c and 13c, one of the piezoelectric elements expands in the longitudinal direction thereof, whereas the other piezoelectric element contracts in the longitudinal direction thereof.

As a result, when the resilient supporting portions 11d and 11d are distorted, the position of the slider 21, mounted to an end portion of the swinging portion 11b, changes. In other words, the slider 21, which is mounted to an end portion of the swinging portion 11b, is moved in the widthwise directions (as indicated by the double-headed arrow in FIG. 2) of a track to allow a tracking operation.

Here, the piezoelectric elements 12 and 13 are joined to the stationary base end portion 11a and the swinging portion 11b by the electrically conductive adhesive resin 15 and the nonconductive adhesive resin 16. Since the bonding strength is reinforced by the nonconductive adhesive resin 16, the bonding strength is increased compared to the case where the electrically conductive adhesive resin 15 is used alone, so that the load beam 11 can be reliably deformed in correspondence with the amounts of distortion of the piezoelectric elements 12 and 13. Thus, the amount of displacement of the slider 21 in the widthwise directions of a track becomes large, so that the precision of the tracking operation can be increased.

For the joining structures of the piezoelectric elements 12 and 13 and the load beam 11, the joining structure shown in FIG. 4 may be used. Although only the joining structure of the piezoelectric element 13 is shown in FIG. 4, the joining structure of the piezoelectric element 12 is the same as the structure shown in FIG. 4. The advantages obtained by the joining structure of the piezoelectric element 13 are the same as those obtained by the joining structure of the piezoelectric element 12.

With the electrode layer 13c facing the stationary base end portion 11a and the swinging portion 11b, the piezoelectric element 13 shown in FIG. 4 is placed on both the stationary base end portion 11a and the swinging portion 11b. An electrically conductive adhesive resin 15 is applied to the portion between the surface of the electrode layer 13c of the piezoelectric element 13 and the stationary base end portion 11a and to the portion between the surface of the electrode layer 13c and the swinging portion 11b. Through the electrically conductive adhesive resin 15, the piezoelectric element 13 is joined to the stationary base end portion 11a and the swinging portion 11b.

As shown in FIG. 4, a nonconductive adhesive resin 17 is disposed at the outer sides of both of the end surfaces 13d and 13e (both end portions), which are disposed at both sides of the piezoelectric element 13 in the directions in which the piezoelectric element 13 expands and contracts (that is, at both sides of the piezoelectric element 13 in FIG. 3 in the longitudinal direction thereof). The nonconductive adhesive resin 17 is applied to the end surfaces 13d and 13e.

The nonconductive adhesive resin 17 is disposed so as to cover a portion of the electrode layer 13b from both end surfaces 13d and 13e. The nonconductive adhesive resin 17 covers the connection portion 14c of the gold wire 14b.

It is preferable that the nonconductive adhesive resin 17 be disposed at both sides of the piezoelectric element 13 in the directions in which it expands and contracts. The nonconductive adhesive resin 17 may protrude slightly from both end portions 13d and 13e of the piezoelectric element 13 in the widthwise direction of the piezoelectric element 13. Although the nonconductive adhesive resin 17 may be disposed outwardly from portions other than both end portions 13d and 13e of the piezoelectric element 13 in the widthwise direction of the piezoelectric element 13, the nonconductive adhesive resin 17 may interfere with the expansion and contraction of the piezoelectric element 13.

In this way, both of the end surfaces 13d and 13e and the stationary base end portion 11a and the swinging portion 11b are joined together through the nonconductive adhesive resin 17.

In the magnetic head device having the above-described structure, the bonding strength between the connection portion 14c and the electrode layer 13b can be reinforced by causing the nonconductive adhesive resin 17 to cover the connection portion 14c of the gold wire 14b, thereby making it possible to prevent breakage of the gold wire 14b from the electrode layer 13b.

The nonconductive adhesive resin 17 is applied to both the electrode layers 12b and 12c of the piezoelectric element 12 and to both the electrode layers 13b and 13c of the piezoelectric element 13. A short circuit does not occur between the electrode layers 12b and 12c or between the electrode layers 13b and 13c because the nonconductive adhesive resin 17 is not electrically conductive.

EXAMPLES

The slider displacement amounts before and after reinforcement by a nonconductive adhesive resin were examined.

After mounting a slider to an end of the load beam 11 shown in FIG. 2, and applying an electrically conductive adhesive resin to the swinging portion and the stationary base end portion of the load beam, a piezoelectric element was mounted. Then, by hardening the electrically conductive adhesive resin as a result of heating it, the piezoelectric element was joined to the load beam, thereby producing magnetic head devices of Samples 1—1 to 20-1. For the electrically conductive adhesive resin, an epoxy adhesive resin mixed with a metal filler was used.

In each magnetic head device, the joining of the piezoelectric element and the load beam was not reinforced by a nonconductive adhesive resin. Therefore, each magnetic head device was a "before-reinforcement" magnetic head device.

Next, after mounting a slider to an end of the load beam shown in FIG. 2, and applying an electrically conductive adhesive resin to the sliding portion and the stationary base end portion of the load beam, a piezoelectric element was mounted. Then, a UV curable nonconductive adhesive resin was disposed at both end portions of the piezoelectric element in the longitudinal direction thereof. Thereafter, after hardening the nonconductive adhesive resin by irradiating it with ultraviolet light, an electrically conductive adhesive rein was hardened as a result of heating it, so that the piezoelectric element was joined to the load beam. Magnetic head devices of Samples 1-2 to 20-2 were produced using this method.

In each magnetic head device, the joining of the piezoelectric element and the load beam was reinforced by the nonconductive adhesive resin. Therefore, each magnetic head device was an "after-reinforcement" magnetic head device.

The magnetic head devices before and after reinforcement were each incorporated in the hard disk device shown in FIG. 1. A voltage of ±30 V (frequency of 500 Hz) was applied to each piezoelectric element in order to carry out a tracking operation of each slider. The slider displacement amounts were measured. The results are shown in Table 1 and FIG. 5.

TABLE 1

| Samples | Slider Displacement Amount ($\mu$m) | Samples | Slider Displacement Amount ($\mu$m) |
|---|---|---|---|
| Sample 1-1 | 0.483 | Sample 1-2 | 0.714 |
| Sample 2-1 | 0.498 | Sample 2-2 | 0.696 |
| Sample 3-1 | 0.501 | Sample 3-2 | 0.745 |
| Sample 4-1 | 0.493 | Sample 4-2 | 0.709 |
| Sample 5-1 | 0.502 | Sample 5-2 | 0.717 |
| Sample 6-1 | 0.493 | Sample 6-2 | 0.725 |
| Sample 7-1 | 0.496 | Sample 7-2 | 0.733 |
| Sample 8-1 | 0.497 | Sample 8-2 | 0.721 |
| Sample 9-1 | 0.504 | Sample 9-2 | 0.710 |
| Sample 10-1 | 0.490 | Sample 10-2 | 0.723 |
| Sample 11-1 | 1.107 | Sample 11-2 | 1.373 |
| Sample 12-1 | 1.120 | Sample 12-2 | 1.359 |
| Sample 13-1 | 1.093 | Sample 13-2 | 1.347 |
| Sample 14-1 | 1.097 | Sample 14-2 | 1.339 |
| Sample 15-1 | 1.122 | Sample 15-2 | 1.315 |
| Sample 16-1 | 1.132 | Sample 16-2 | 1.329 |
| Sample 17-1 | 1.120 | Sample 17-2 | 1.353 |
| Sample 18-1 | 1.103 | Sample 18-2 | 1.328 |
| Sample 19-1 | 1.130 | Sample 19-2 | 1.352 |
| Sample 20-1 | 1.078 | Sample 20-2 | 1.292 |

Figure 5:
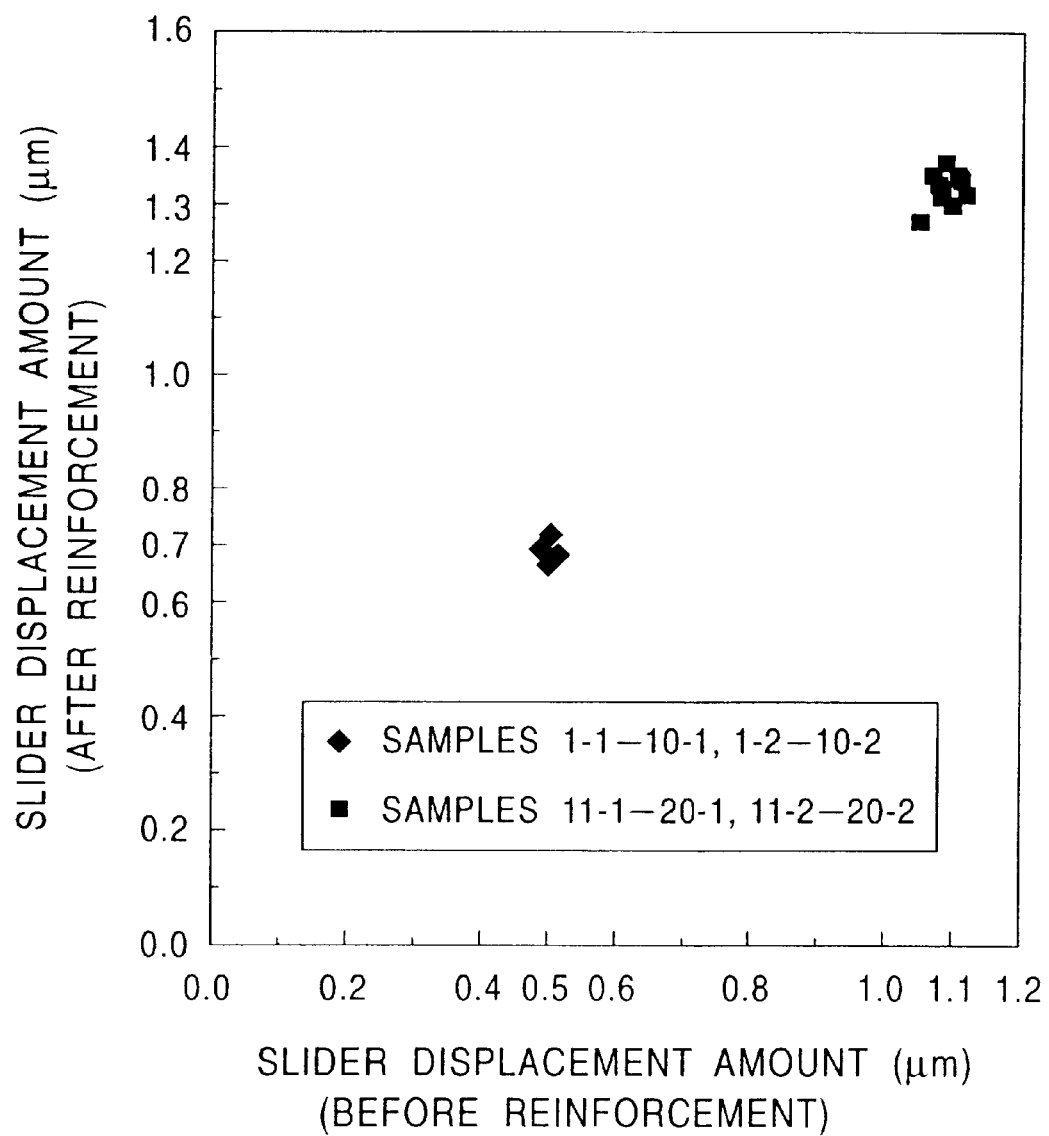
FIG. 5 is a graph showing the relationship between the slider displacement amounts in the magnetic head devices before and after reinforcement.
Figure 6:
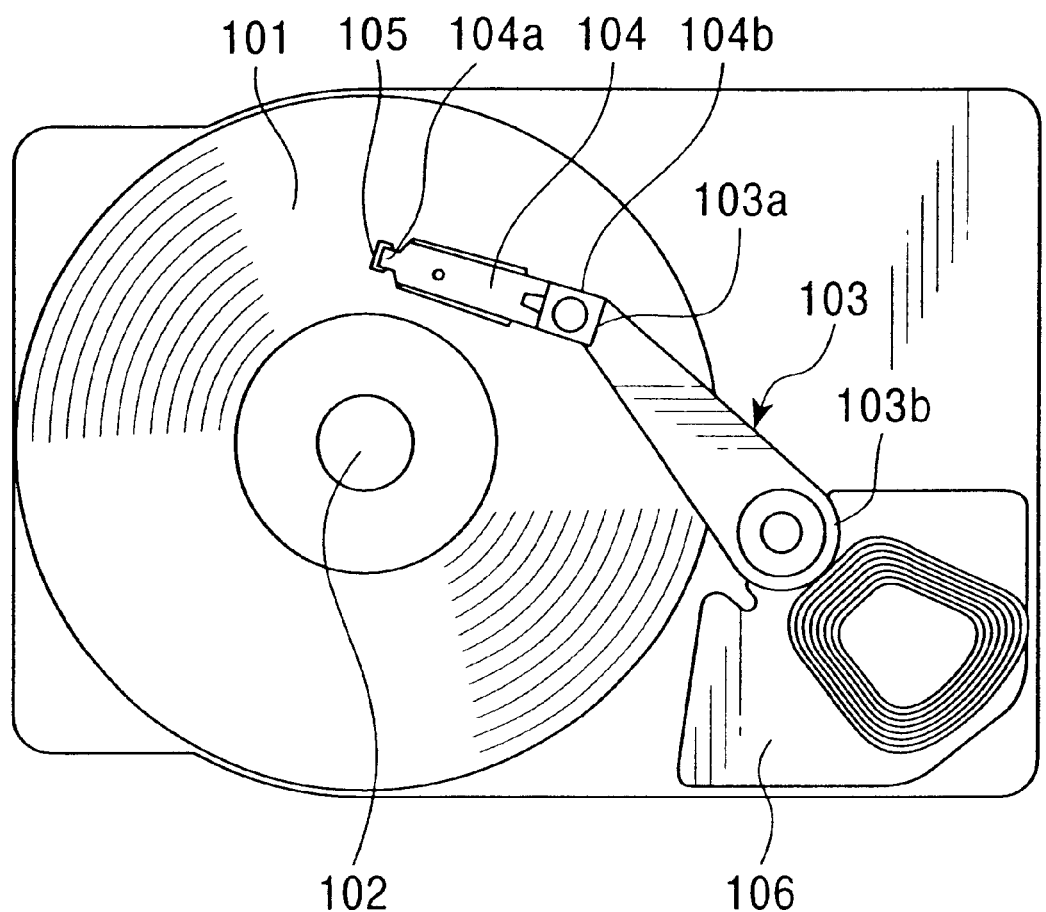
FIG. 6 is a plan view of a conventional hard disk device.
Figure 7:
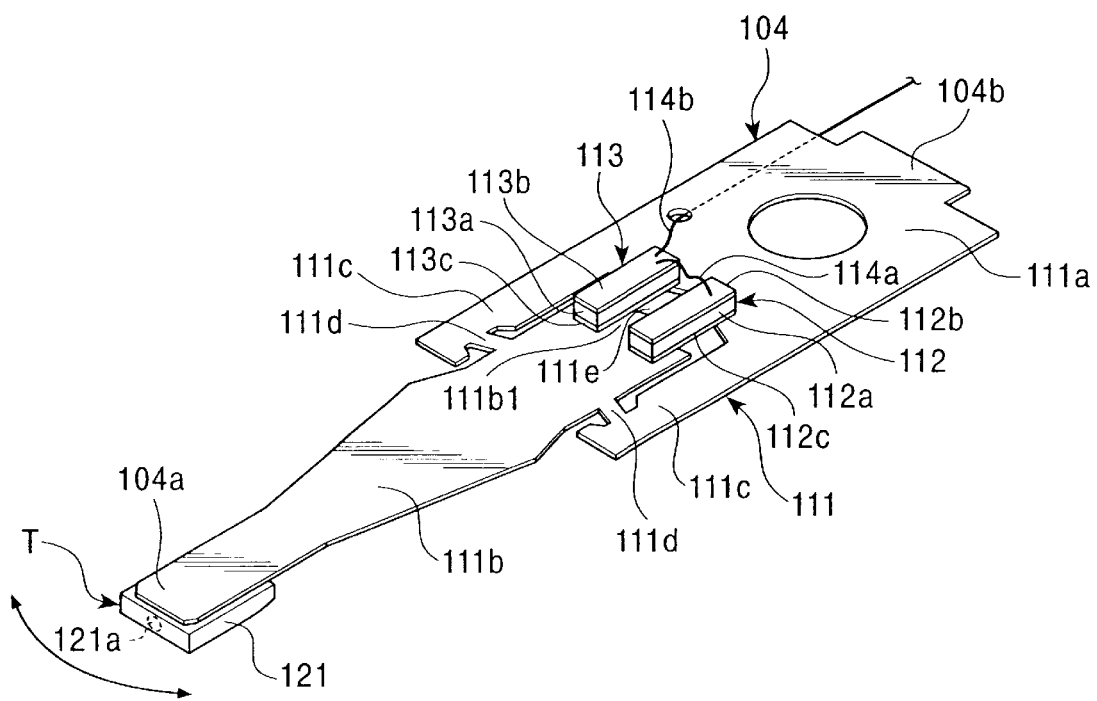
FIG. 7 is a perspective view of a conventional magnetic head device.
Figure 8:
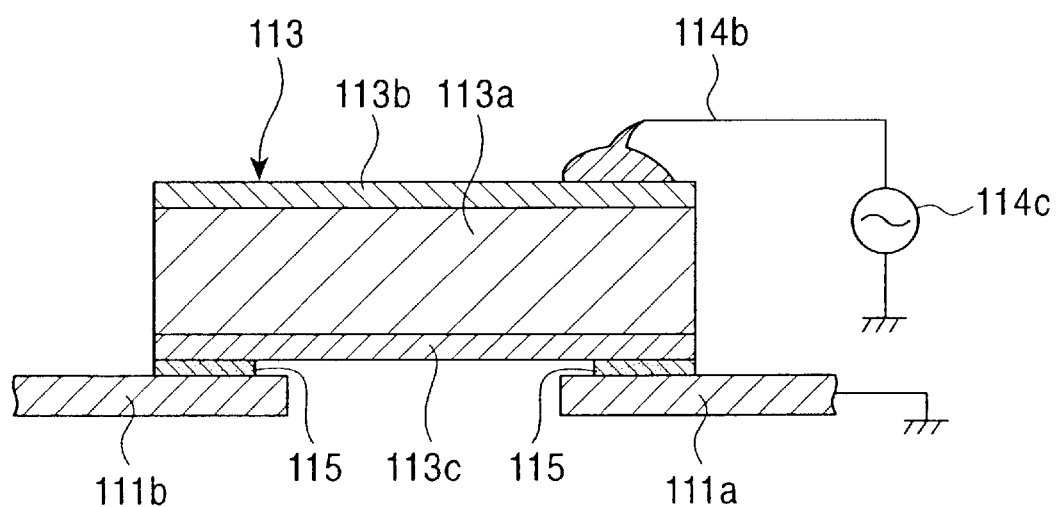
FIG. 8 is an enlarged sectional view of the main portion of the magnetic head device shown in FIG. 7.

FIG. 5 is a graph showing the relationship between the slider displacement amounts of the magnetic head devices before and after reinforcement. The horizontal axis represents the slider displacement amounts of the magnetic head devices before reinforcement, and the vertical axis represents the slider displacement amounts of the magnetic head devices after reinforcement.

As shown in Table 1 and by a plot of black rhombic marks in FIG. 5, whereas the displacement amounts in the magnetic head devices of Samples 1—1 to 10-1 prior to reinforcement are of the order of 0.48 to 0.50 $\mu$m, the displacement amounts in the magnetic head devices of Samples 1-2 to 10-2 after reinforcement are of the order of 0.69 to 0.74 $\mu$m. It can be seen that the displacement amounts increase by a value of the order of 0.2 $\mu$m when the displacement amounts before and after reinforcement are compared.

Similarly, as shown in Table 1 and by a plot of black square marks in FIG. 5, whereas the displacement amounts in the magnetic head devices of Samples 11-1 to 20-1 prior to reinforcement are of the order of 1.07 to 1.13 $\mu$m, the displacement amounts in the magnetic head devices of Samples 11-2 to 20-2 after reinforcement are of the order of 1.29 to 1.37 $\mu$m. It can be seen that the displacement amounts increase by a value of the order of 0.2 $\mu$m when the displacement amounts before and after reinforcement are compared.

Accordingly, it can be understood that, by reinforcing the bonding strength between the piezoelectric element and the load beam by a nonconductive adhesive resin, the load beam is reliably deformed in correspondence with the amount of deformation of the piezoelectric element, so that the slider displacement amount increases, thereby making it possible to increase the precision of a tracking operation.

As described in detail above, according to the magnetic head device of the present invention, the piezoelectric elements are joined to the stationary base end portion and the swinging portion by an electrically conductive adhesive resin and a nonconductive adhesive resin. Therefore, compared to the case where only an electrically conductive adhesive resin is used, it is possible to increase the bonding strength, to reliably deform the resilient supporting member in correspondence with the amounts of deformation of the piezoelectric elements. Consequently, the precision of the tracking operation can be increased.

In addition, since the nonconductive adhesive resin is applied to both end portions of the piezoelectric elements in the directions in which they expand and contract, the nonconductive adhesive resin does not interfere with the expansion and contraction of the piezoelectric elements, thereby making it possible to increase the precision of the tracking operation.

Further, when the nonconductive adhesive resin is applied to both end portions of the piezoelectric elements, even if the nonconductive adhesive resin is applied to the pairs of electrode layers that sandwich the corresponding piezoelectric layers, a short circuit between the corresponding electrode layers will not occur because the nonconductive adhesive resin is not electrically conductive.

While the invention has been described with reference to specific embodiments, the description is illustrative of the invention and not to be construed as limiting the invention. Various modifications and applications may occur to those skilled in the art without departing from the true spirit and scope of the invention as defined in the appended claims.

What is claimed is:

1. A magnetic head device comprising:
    a slider having provided thereat a reproducing element and a recording element, with the reproducing element being used to detect a magnetic signal recorded on a recording medium and a recording element being used to record a magnetic signal on the recording medium;
    a resilient supporting member which supports the slider; and
    a piezoelectric element, mounted on the resilient supporting member, to change a position of the slider by distorting the resilient supporting member;
    wherein the piezoelectric element has a piezoelectric layer and a pair of electrode layers which sandwich the piezoelectric layer;

wherein the resilient supporting member has a stationary base end portion and a swinging portion, the swinging portion supporting the slider and connected to the stationary base end portion, and the swinging portion being swingable with respect to the stationary base end portion by the piezoelectric element;

wherein, with one of the electrode layers of the piezoelectric element opposing the stationary base end portion and the swinging portion, the piezoelectric element is disposed on both the stationary base end portion and the swinging portion; and wherein a surface of the one of the electrode layers, the stationary base end portion, and the swinging portion are joined together through an electrically conductive adhesive resin, and both end portions of the piezoelectric element in directions in which the piezoelectric element expands and contracts, the stationary base end portion, and the swinging portion are joined together through a nonconductive adhesive resin.

2. A magnetic head device according to claim 1, wherein a lead used for applying a voltage is connected to the other electrode layer of the piezoelectric element, and wherein the nonconductive adhesive resin is applied from both end portions of the piezoelectric element to part of the other electrode layer and to a connection portion of the lead and the other electrode layer.

3. A magnetic head device comprising:

a load beam having a swinging portion and a stationary base portion separated by a gap, the stationary base portion having arms extending substantially in parallel with the swinging portion and connected with the swinging portion through resilient supporting portions;

a slider mounted on an end of the swinging portion of the load beam;

a plurality of piezoelectric elements spanning the gap and substantially in parallel with the arms, each piezoelectric element having a piezoelectric layer and a plurality of electrode layers that sandwich the piezoelectric layer, a lowermost electrode layer of the plurality of electrode layers attached to the stationary base portion and the swinging portion with an electrically conductive adhesive; and a non-conductive adhesive attached to the electrically conductive adhesive, the lowermost electrode layer, and the piezoelectric layer of each of the plurality of piezoelectric elements such that the non-conductive adhesive is disposed one of more proximate and more distal from the slider than the piezoelectric element to which the non-conductive adhesive is attached.

4. The magnetic head device of claim 3, wherein the non-conductive adhesive has a plurality of sections, a first section of the non-conductive adhesive is disposed more proximate from the slider than the piezoelectric element to which the first section is attached and a second section of the non-conductive adhesive is disposed more distal from the slider than the piezoelectric element to which the second section is attached.

5. The magnetic head device of claim 4, wherein the non-conductive adhesive attached to each of the piezoelectric elements does not substantially contact side faces of the piezoelectric element to which the non-conductive adhesive is attached.

6. The magnetic head device of claim 4, wherein the non-conductive adhesive is a thermosetting resin.

7. The magnetic head device of claim 6, wherein the resin is ultraviolet (UV) curable.

8. The magnetic head device of claim 7, wherein the resin is one of polyester UV curable resin and acrylic UV curable resin.

9. The magnetic head device of claim 4, wherein the non-conductive adhesive covers a portion of an uppermost electrode layer of the plurality of electrode layers.

10. The magnetic head device of claim 9, further comprising a conductor connected to the uppermost electrode layer of one of the piezoelectric elements through a connection portion, the conductor connected to a control circuit that controls a voltage applied to the piezoelectric elements, wherein the second section substantially covers the connection portion.

11. The magnetic head device of claim 3, wherein the non-conductive adhesive is attached to the electrically conductive adhesive, the lowermost electrode layer, and the piezoelectric layer at opposing ends of each of the piezoelectric elements.

12. The magnetic head device of claim 3, wherein the non-conductive adhesive attached to each of the piezoelectric elements does not substantially contact side faces of the piezoelectric element to which the non-conductive adhesive is attached.

13. The magnetic head device of claim 3, wherein the non-conductive adhesive covers a portion of an uppermost electrode layer of the plurality of electrode layers.

14. The magnetic head device of claim 13, further comprising a conductor connected to the uppermost electrode layer of one of the piezoelectric elements through a connection portion, the conductor connected to a control circuit that controls a voltage applied to the piezoelectric elements, wherein the non-conductive adhesive substantially covers the connection portion.

15. A method of increasing displacement of a slider disposed on a swinging portion of a resilient member comprising attaching each of a pair of piezoelectric elements to a stationary base portion and the swinging portion of the resilient member using both electrically conductive adhesive and non-conductive adhesive.

16. The method of claim 15, further comprising attaching a lowermost electrode of each of the pair of piezoelectric elements to the stationary base portion and the swinging portion of the resilient member through the electrically conductive adhesive and attaching at least a piezoelectric layer and the lowermost electrode of each of the pair of piezoelectric elements to the stationary base portion and the swinging portion of the resilient member through the non-conductive adhesive.

17. The method of claim 16, further comprising positioning the piezoelectric elements on the stationary base portion and the swinging portion of the resilient member, attaching the piezoelectric elements to the stationary base portion and the swinging portion of the resilient member with the electrically conductive adhesive, and thereafter applying the non-conductive adhesive to the piezoelectric element.

18. The method of claim 17, further comprising applying the non-conductive adhesive to ends of the piezoelectric elements most proximate to and most distal to the slider.

19. The method of claim 18, further comprising maintaining side faces of the piezoelectric elements substantially free from contact with the non-conductive adhesive.

20. The method of claim 18, further comprising covering a portion of each uppermost electrode layer of the plurality of electrode layers with the non-conductive adhesive.

21. The method of claim 17, further comprising applying the non-conductive adhesive to at least one end of each of the piezoelectric elements, each end to which the nonconductive adhesive is applied being one of most proximate to and most distal to the slider.

22. The method of claim 15, further comprising electrically connecting uppermost electrodes of each of the pair of piezoelectric elements to each other and to a control circuit and controlling distortion of the piezoelectric elements through voltage supplied by the control circuit.

23. The method of claim 22, further comprising forming a connection portion on one of the uppermost electrodes, the connection portion being part of the connection between the one of the uppermost electrodes and the control circuit, and substantially covering the connection portion with the non-conductive adhesive.

24. The method of claim 15, wherein the non-conductive adhesive is resin and the method further comprises UV curing the resin and thermally curing the conductive adhesive.

25. A magnetic head device comprising:
a load beam having a swinging portion and a stationary base portion separated by a gap, the stationary base portion having arms extending substantially in parallel with the swinging portion and connected with the swinging portion through resilient supporting portions;
a slider mounted on an end of the swinging portion of the load beam;
a piezoelectric element spanning the gap and substantially in parallel with the arms, the piezoelectric element having a piezoelectric layer and a plurality of electrode layers that sandwich the piezoelectric layer, a lowermost electrode layer attached to the stationary base portion and the swinging portion with an electrically conductive adhesive; and
a non-conductive adhesive attached to the electrically conductive adhesive, the lowermost electrode layer, and the piezoelectric layer such that the non-conductive adhesive is disposed more proximate to and more distal from the slider than the piezoelectric element.

26. The magnetic head device of claim 25, wherein the non-conductive adhesive does not substantially contact side faces of the piezoelectric element.

27. The magnetic head device of claim 25, wherein the non-conductive adhesive covers a portion of an uppermost electrode layer of the plurality of electrode layers.

28. The magnetic head device of claim 27, further comprising a conductor connected to the uppermost electrode layer through a connection portion, the conductor connected to a control circuit that controls a voltage applied to the piezoelectric element, wherein the non-conductive adhesive substantially covers the connection portion.

29. A magnetic head device comprising:
a slider;
a resilient supporting member which supports the slider; and
means for distorting the resilient supporting member, thereby changing a position of the slider;
wherein the means for distorting the resilient supporting member is connected with the resilient supporting member through an electrically conductive adhesive and through a nonconductive adhesive.

30. The magnetic head device of claim 29, wherein the nonconductive adhesive is connected with ends of the means for distorting the resilient supporting member in a direction of distortion of the means for distorting the resilient supporting member.

31. The magnetic head device of claim 29, further comprising means for electrically connecting a voltage to the means for distorting the resilient supporting member, wherein the means for electrically connecting is connected with the means for distorting the resilient supporting member through a connection portion disposed on the means for distorting the resilient supporting member, the nonconductive adhesive covering substantially all of the connection portion.

* * * * *